United States Patent [19]
Dillinger

[11] Patent Number: 5,806,418
[45] Date of Patent: Sep. 15, 1998

[54] CUTTING STATION FOR A PRINTING PRESS

[75] Inventor: David Dillinger, Coral Springs, Fla.

[73] Assignee: Webtron Corporation, Ft. Lauderdale, Fla.

[21] Appl. No.: 840,218

[22] Filed: Apr. 11, 1997

[51] Int. Cl.$^6$ ................ B44B 5/00; B26D 7/20
[52] U.S. Cl. .............. 101/24; 101/226; 83/346; 83/659
[58] Field of Search ................ 101/24, 30, 226; 400/621; 83/346, 659, 331, 341, 343

[56] References Cited

U.S. PATENT DOCUMENTS

| | | | |
|---|---|---|---|
| 2,382,175 | 8/1945 | Salfisberg | 101/24 |
| 3,651,723 | 3/1972 | Gallagher, Jr. et al. | 83/659 |
| 4,014,257 | 3/1977 | Bettenhausen | 101/24 |
| 4,044,641 | 8/1977 | Burt, Jr. et al. | 83/346 |
| 4,455,903 | 6/1984 | Kesten | 83/659 |

OTHER PUBLICATIONS

Mark Andy Inc., The Mark Andy Advantage, "We questioned everything . . . Here's the answer", 6 pages, including drawing page.

*Primary Examiner*—Eugene H. Eickholt
*Attorney, Agent, or Firm*—Hovey, Williams, Timmons & Collins

[57] ABSTRACT

A cutting station (10) that permits rapid change-over and adjustment of its cutting and anvil rollers (62,60) between printing runs is disclosed. The cutting station (10) includes a frame (14) having a longitudinal axis (19) defining a web travel path; an anvil roller (62) configured for rotatably mounting on the frame; a cutting roller (60) configured for rotatably mounting on the frame (14) adjacent the anvil roller (62); and an improved biasing assembly (18) for biasing the cutting roller (62) against the anvil roller (60). The biasing assembly (18) includes a track (80) extending transversely from the frame (14), a carriage (82) slidably mounted on the track (80) for movement toward and away from the frame (14), and a biasing member (84) mounted for vertical shifting movement below the carriage (82).

20 Claims, 4 Drawing Sheets

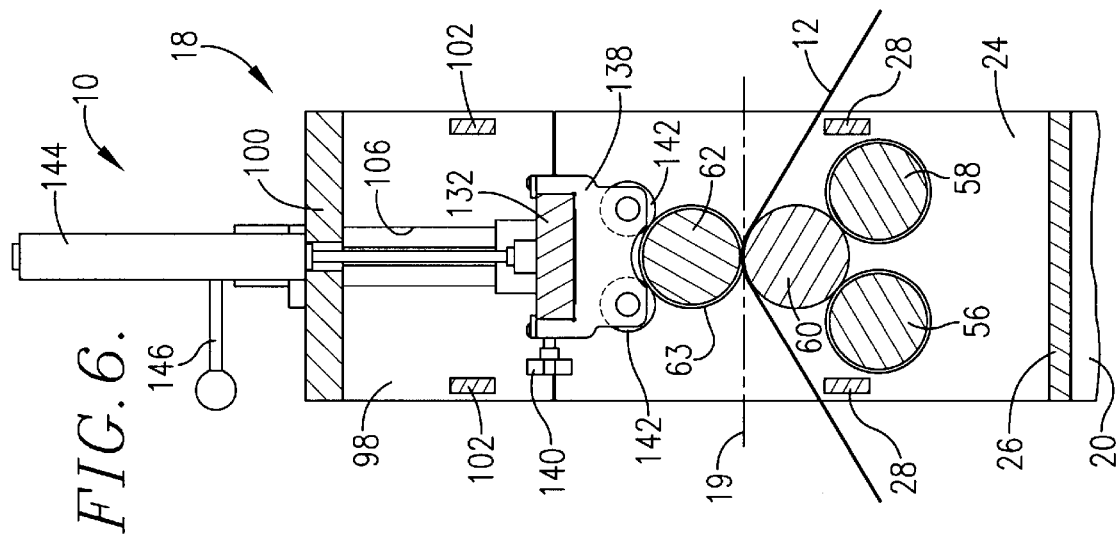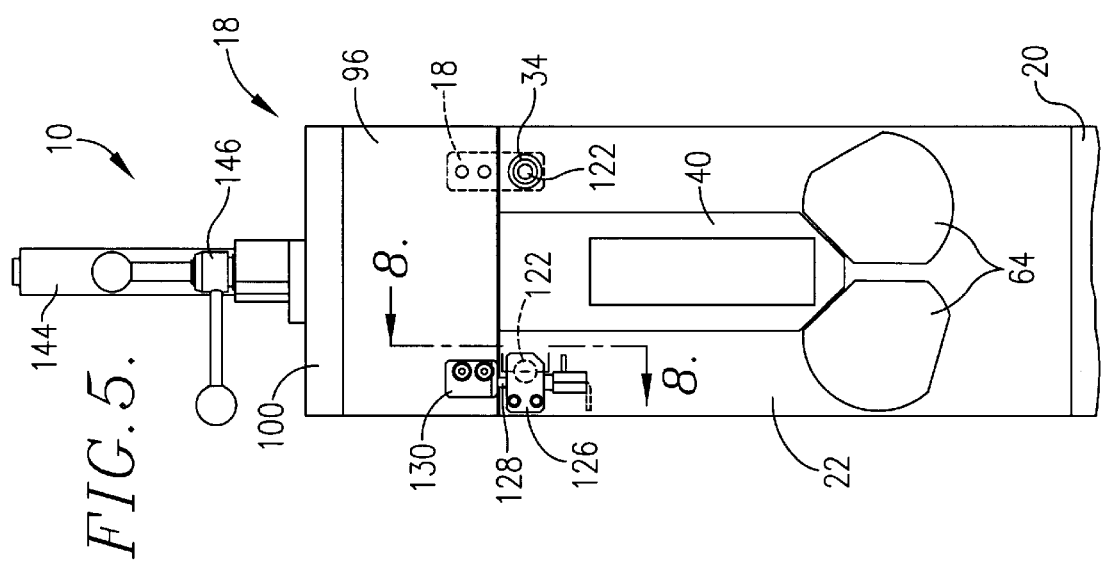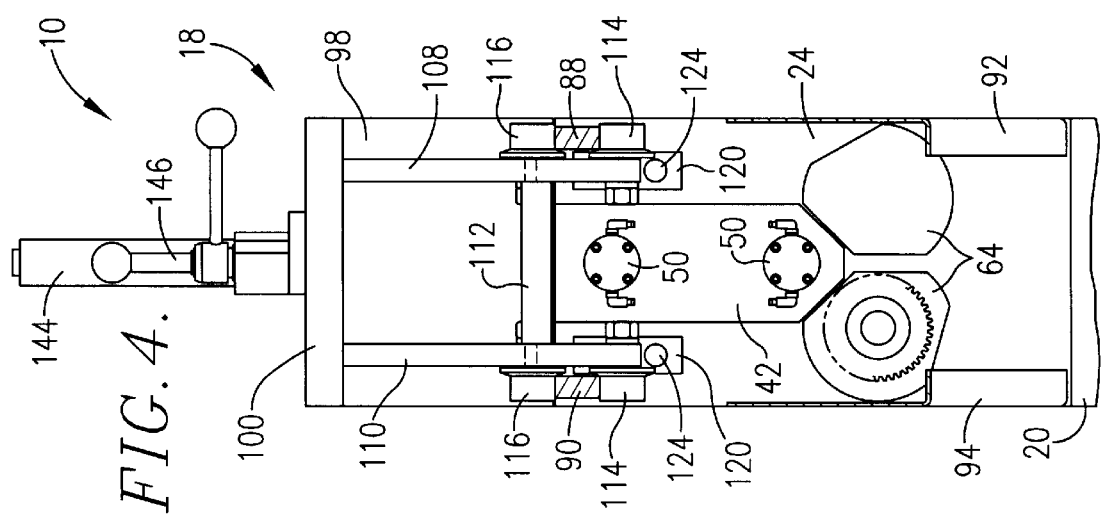

CUTTING STATION FOR A PRINTING PRESS

BACKGROUND OF THE INVENTION

1. Field of the Invention

The present invention relates to cutting stations for use with printing presses. More particularly, the invention relates to a cutting station having a construction that permits rapid change-over and adjustment of its cutting and anvil rollers between printing runs.

2. Description of the Prior Art

Cutting stations are commonly used in printing presses for die-cutting or sheeting a web of material as it passes through the press. A typical cutting station includes a cutting roller and a base or anvil roller rotatably mounted between a pair of side frames and defining a nip region therebetween for passage of the web. The cutting roller is adapted for receiving a die or sheeting cutter on its circumferential surface for cutting or sheeting the web as it passes between the rollers.

Cutting stations also include biasing assemblies that bias or press their cutting rollers against the anvil rollers to maintain adequate pressure between the rollers to effect cutting of the web. Prior art biasing assemblies typically include one or more clamps mounted to a die head positioned over the cutting roller. The clamps are manually operated to push the cutting roller downwardly against the anvil roller to achieve the desired cutting pressure.

Unfortunately, such prior art biasing assemblies are difficult and time-consuming to operate, especially when a cutting station must be changed over for a new printing run. Specifically, when a cutting station is changed over for a new run, the cutting and anvil rollers usually must be replaced with different rollers. Such change-over is difficult with prior art cutting stations because their biasing assemblies must first be totally removed before the rollers can be removed. Then, once the old rollers have been removed and replaced with new rollers, the biasing assemblies must be reattached and readjusted to provide the optimal biasing pressure on the cutting rollers. These steps are time-consuming and labor-intensive, and therefore significantly add to the expenses of printing operations, especially for short printing runs.

Cutting stations having biasing assemblies that can be shifted away from their rollers without completely removing the biasing assemblies have been developed to simplify this roller change-over procedure. However, even these shiftable biasing assemblies cannot be shifted completely away from the rollers. Additionally, known prior art shiftable biasing assemblies are difficult to readjust after the new rollers have been installed.

OBJECTS AND SUMMARY OF THE INVENTION

In view of the foregoing, it is an object of the present invention to provide an improved printing press cutting station.

It is a more particular object of the present invention to provide a cutting station having a construction that permits rapid change-over and adjustment of the cutting and anvil rollers between printing runs.

It is a still more particular object of the present invention to provide a cutting station having a roller biasing assembly that can be completely shifted away from the cutting and anvil rollers during roller change-over, easily shifted back over the new rollers, and quickly and easily readjusted to provide the optimal biasing force on the cutting roller.

The present invention achieves these objects and other objects that become evident from the description of the preferred embodiments of the invention herein by providing a printing press cutting station having an improved roller biasing assembly. The cutting station of the present invention broadly includes an elongated frame having a longitudinal axis defining a web travel path; an anvil roller configured for rotatably mounting on the frame; a cutting roller configured for rotatably mounting on the frame adjacent the anvil roller; and an improved biasing assembly for biasing the cutting roller against the anvil roller to effect cutting of the web. The biasing assembly includes a biasing member and mounting means for slidably mounting the biasing member to the frame for sliding movement along an axis generally transverse to the frame longitudinal axis.

The biasing member mounting means preferably includes an elongated track extending generally transversely from one side of the frame and a carriage assembly slidably mounted on the track and shiftable in a direction transverse to the longitudinal axis of the frame. The biasing member depends from the carriage and is moved vertically toward and away from the cutting roller by a cylinder. The biasing assembly also includes at least one clamp operably coupled between the carriage assembly and the biasing member for clamping and locking the biasing member against the cutting roller when the biasing member is shifted to its lowered position by the cylinder for maintaining the biasing force on the cutting roller.

With this construction, the carriage and biasing member can be slid rearward away from the cutting and anvil rollers during roller changeover and then easily slid back over the rollers after new rollers have been inserted on the frame. This completely removes the biasing assembly away from the rollers during changeover and therefore provides the operator easy access to the rollers.

Once the rollers have been replaced and the biasing assembly has been slid back over the rollers, the biasing member can be lowered and clamped against the cutting roller to provide the proper biasing force by simply operating the cylinder and clamps.

BRIEF DESCRIPTION OF THE DRAWING FIGURES

A preferred embodiment of the present invention is described in detail below with reference to the attached drawing figures, wherein:

FIG. 4 is a section view taken along line 4—4 of FIG. 1;

FIG. 5 is a working side view of the cutting station;

FIG. 6 is a section view taken along line 6—6 of FIG. 1;

FIG. 7 is a section view taken along line 7—7 of FIG. 1; and

FIG. 8 is a enlarged section view taken along line 8—8 of FIG. 5.

DETAILED DESCRIPTION OF THE PREFERRED EMBODIMENTS

Figure 1:
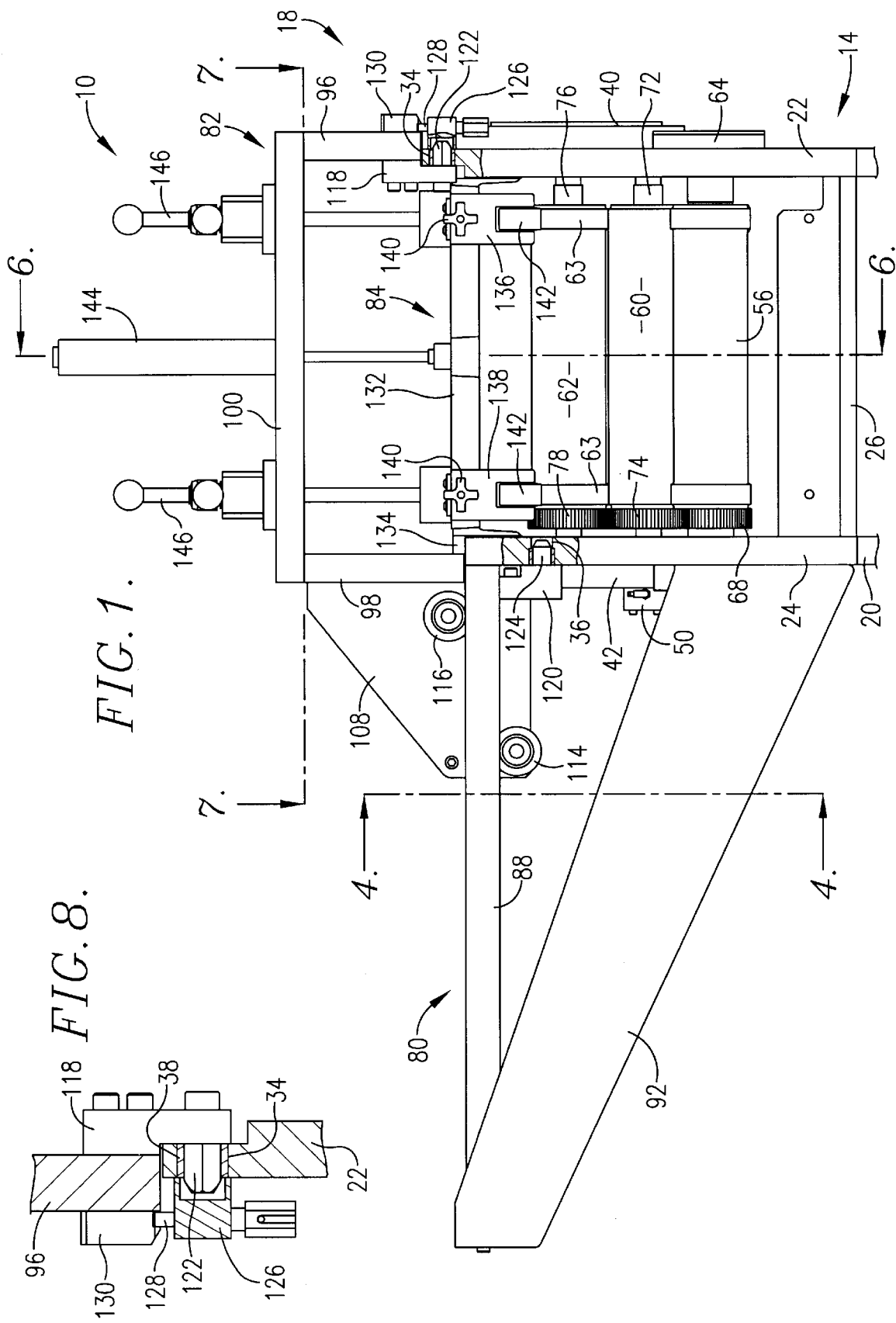
FIG. 1 is a side elevational view of a cutting station constructed in accordance with a preferred embodiment of the present invention showing the biasing assembly in its operational position and showing the side frames of the cutting station partially broken away.

The drawing figures illustrate a cutting station 10 constructed in accordance with a preferred embodiment of the invention. The cutting station 10 is configured for use in a printing press such as a flexographic web printing press and is operable for die-cutting or sheeting a web of material 12 (FIG. 6) as it passes through the press. As best illustrated in FIG. 1, the cutting station 10 broadly includes a frame 14, a plurality of fixed and removable rollers (individually numbered below) rotatably supported on the frame, and a biasing assembly broadly referred to by the numeral 18 for biasing the rollers into engagement with one another.

In more detail, the frame 14 has a longitudinal axis 19 (FIG. 6) that defines the travel path for the web 12 as it passes through the cutting station 10. As illustrated in FIG. 1, the frame 14 may be supported on top of another frame or stand 20 and includes a pair of laterally spaced, vertically extending front and rear side frames 22,24 and a horizontally extending bottom plate 26 interconnecting the side frames. The frame 14 may also include a plurality of horizontally extending bars 28 for spacing the side frames 22,24 (FIG. 6).

The front and rear side frames 22,24 each includes a vertical slot 30,32 best illustrated in FIGS. 2 and 7 for guiding and supporting the shafts of the removable rollers and for guiding the vertical movement of the biasing assembly 18 as described more fully below. The front side frame 22 also includes a pair of horizontally spaced pin-receiving apertures 34 (FIGS. 1 and 8) extending through its upper end for guiding the lateral movement of the biasing assembly 18 as described below. Similarly, the rear side frame 24 includes a pair of pin-receiving apertures 36 extending through its upper end. Each of the pin-receiving apertures 34,36 has a bearing or bushing 38 mounted therein as best illustrated in FIG. 8.

A pair of vertically extending front and rear die guides 40,42 are mounted to the exterior of the front and rear side frames 22,24, respectively. Each die guide 40,42 includes a vertical slot 44,46 (FIGS. 2 and 7) that is in alignment with the slot 30,32 of its respective side frame 22,24.

Figure 2:
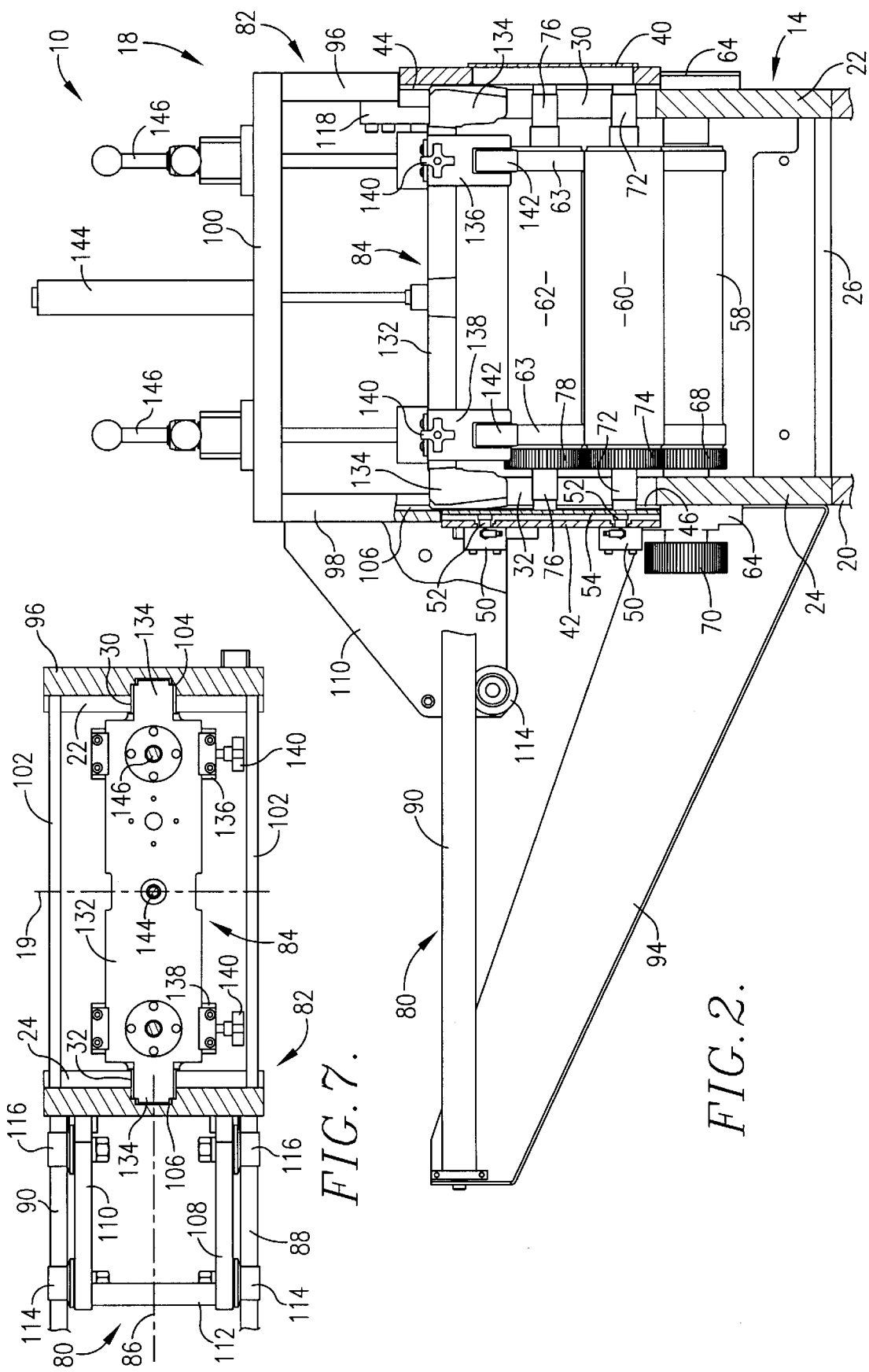
FIG. 2 is a vertical section view of the cutting station with the biasing assembly in its operational position.

As best illustrated in FIGS. 2 and 4, a pair of vertically spaced cylinders 50 are attached to the exterior of the rear die guide 42 so that their pistons 52 extend horizontally through the die guide 42 and into its slot 46. The ends of the pistons 52 are attached to a vertically extending pressure plate 54. The cylinders are coupled with an appropriate source of operating fluid to extend the pressure plate 54 into the slot 46 for laterally securing the rollers between the side frames 22,24 as described more fully below.

The rollers 16 are best illustrated in FIG. 6 and preferably consist of a pair of fixed base rollers 56,58, a removable anvil or base roller 60, and a cutting roller 62 all rotatably mounted between the front and rear side frames 22,24. The fixed base rollers 56,58 are rotatably journaled between the side frames 22,24 by bearing assemblies 64 best illustrated in FIGS. 4 and 5. As illustrated in FIG. 2, one end of each fixed base roller 56,58 includes a circular gear 68 supported thereon. One of the fixed base rollers is coupled with a drive gear 70 that is connected to the drive assembly of the printing press for driving rotation of the rollers.

Figure 3:
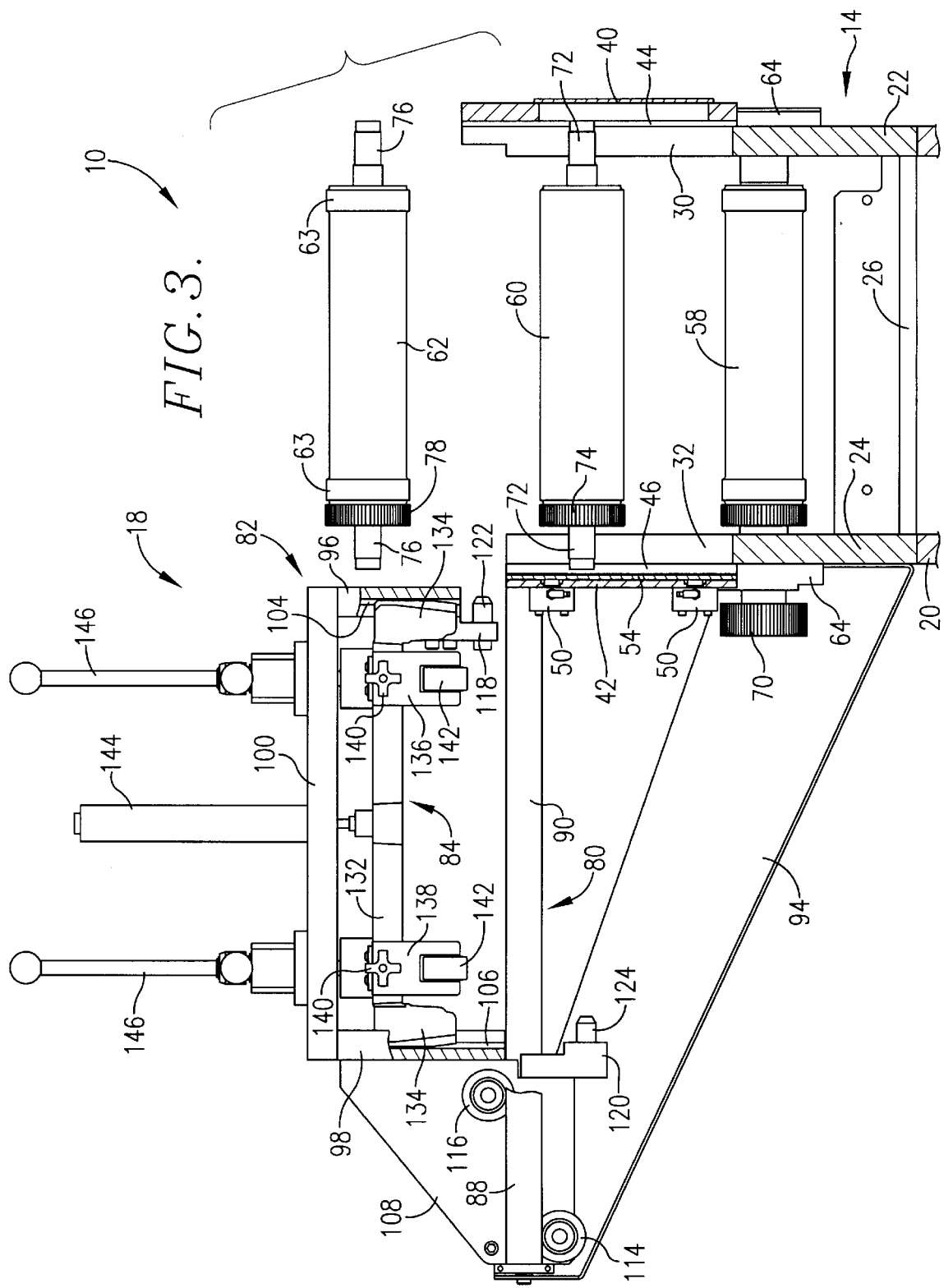
FIG. 3 is a vertical section view of the cutting station illustrating the removal and/or replacement of the cutting and anvil rollers from the cutting station frame.

As best illustrated in FIG. 3, the anvil roller 60 is removable from the frame 14 and is adapted for rotatably mounting between the front and rear side frames 22,24 by bearings 72 mounted to the ends of its shaft. The anvil roller 60 is mounted on the frame 14 by first inserting the ends of its shaft between the slots 30,32 in the front and rear side frames 22,24 and then urging the roller downwardly into the slots 44,46 of the die guides 40,42. When the anvil roller 60 is inserted in the frame 14, it is rotatably mounted on top of the fixed base rollers 56,58. One end of the anvil roller 60 includes a circular gear 74 that engages the gears 68 on the fixed base rollers so that the anvil roller rotates with the fixed base rollers.

The cutting roller 62 is also removable from the frame and is adapted for rotatably mounting between the front and rear side frames 22,24 by bearings 76 mounted to the ends of its shaft. The cutting roller 62 is adapted for receipt of a conventional cutting or sheeting die on its outer circumferential surface and includes an annular circumscribing bearer 63 on each of its ends.

As with the anvil roller 60, the cutting roller 62 is mounted on the frame 14 by first inserting the ends of its shaft between the slots 30,32 in the side frames 22,24 and then urging the roller 62 downwardly into the slots 44,46 of the die guides 40,42. When the cutting roller 62 is inserted in the frame 14, it is rotatably mounted on top of the anvil roller 60. One end of the cutting roller 62 includes a circular gear 78 that engages the anvil roller gear 72 so that the cutting roller rotates with the anvil roller and the fixed base rollers 56,58.

The cylinders 50 and pressure plate 54 described above hold the anvil and cutting rollers 60,62 laterally in place between the side frames 22,24. Specifically, the cylinders 50 are operated to shift their pistons 52 and the attached pressure plate 54 against the ends of the shafts of the rollers 60,62. This pushes the rollers 60,62 forward (rightward as viewed from FIGS. 1–3) against the front die guide 40 to hold the rollers in place laterally.

The biasing assembly 18 is provided for biasing or urging the cutting roller 62 downwardly against the anvil roller 60 to effect cutting of the web 12 as it passes through the cutting station 10. In accordance with the present invention, the biasing assembly 18 includes an elongated track 80 extending transversely from the rear of the cutting station frame 14, a carriage 82 slidably mounted on the track, and a biasing member 84 supported for vertical shifting movement below the carriage assembly.

As best illustrated in FIGS. 2 and 7, the track 80 includes a pair of horizontally extending and laterally spaced rails 88,90 extending outwardly from the rear side frame 24. The rails 88,90 are supported by a pair of angled, laterally spaced rail supports 92,94 extending between the outermost ends of the rails and the bottom of the rear side frame 24. The track 80 has a longitudinal axis 86 that is generally transverse to the longitudinal axis 19 of the cutting station frame 14.

The carriage 82 includes a pair of longitudinally spaced, vertically extending front and rear side plates 96,98, a horizontally extending top plate 100, and a pair of horizontally extending spacer bars 102 extending between the side plates. The front side plate 96 has a vertical slot 104 (FIGS. 3 and 7) that is in alignment with the slot 30 in the front side frame 22 and the slot 44 in the front die guide 40. Similarly, the rear side plate 98 has a vertical slot 106 that is in alignment with the slot 32 in the rear side frame 24 and the slot 46 in the rear die guide 42.

The carriage 82 is supported on the track 80 by a pair of laterally spaced, vertically extending wheel plates 108,110 that extend outwardly from its rear side plate 98. The wheel plates 108,110 are interconnected by a horizontally extending spacer bar 112 (FIG. 7) and each includes a pair of wheels 114,116 rotatably mounted thereon. As best illustrated in FIG. 3, the wheels 114,116 are horizontally and vertically spaced so that one wheel 114 rides on the lower surface of its respective rail 88,90 and the other wheel 116 rides on the upper surface of the rail.

The wheel plates 108,110 and wheels 114,116 slidably mount the carriage 82 on the track 80 for movement along the track axis 86 between a retracted, change-over position illustrated in FIG. 3 and an operating position illustrated in FIGS. 1 and 2. When the carriage 82 is shifted to its retracted, change-over position, it is moved rearward away from the cutting and anvil rollers 60,62 to permit removal of the rollers. Conversely, when the carriage 82 is shifted to its operating position, it is moved forward over the cutting and anvil rollers 60,62.

To guide the sliding movement of the carriage 82, the carriage includes a pair of alignment pin blocks 118 that depend from the front side plate 96 and a pair of alignment pin blocks 120 that depend from the wheel plates 108,110 as best illustrated in FIGS. 3, 4, and 8. Each pin block 118,120 includes a horizontally extending alignment pin 122,124 extending toward the front or working side of the cutting station 10. When the carriage is shifted to its operating position, the alignment pins 122,124 are received within the bushings 38 in the front and rear side frames 22,24.

To lock the carriage 82 in its operating position, the cutting station 10 also includes a latch block 126 having a retractable, upwardly spring-biased latch pin 128 attached to the upper end of the front side frame 22 (FIGS. 5 and 8). A corresponding latch-pin catch 130 having a recess for receiving the latch pin 128 is mounted on the exterior of the carriage front side plate 96 above the latch block 126. To lock the carriage 82 in its operating position, the latch pin 128 on the latch block 126 is merely inserted in the corresponding recess of the catch 130.

The biasing member 84 depends from the carriage 82 and includes a horizontally extending bridge plate 132 having a pair of outwardly extending guide tabs 134 as best illustrated in FIGS. 2 and 7. The guide tabs 134 extend into the slots 104,106 in the carriage side plates 96,98 and the slots 30,32 in the side frames 22,24 for guiding the vertical movement of the biasing member 84.

The biasing member 84 also includes a pair of vertically extending wheel carriages 136,138 secured to the ends of the bridge plate 132 by rotary clamps 140. Each wheel carriage 136,138 has a pair of depending, rotatable wheels 142 that engage the annular bearers 63 on the outer surface of the cutting roller 62 when the bearing member 84 is shifted to its operating position as described below.

The biasing member 84 is supported for vertical shifting movement toward and away from the cutting roller 62 by a cylinder 144 and a pair of plunger-type clamps 146 mounted to the top plate 100 of the carriage 82. The cylinder 144 is coupled with a suitable source of operating fluid for shifting the biasing member 84 between a raised position illustrated in FIG. 3 and a lowered position illustrated in FIGS. 1 and 6. The cylinder 144 is preferably coupled with a valve and a 3-position toggle switch that permits the operator to selectively raise, lower, and stop the biasing member.

When the cylinder 144 shifts the biasing member 84 to its raised position, the bridge plate 132 is raised so that it is immediately below the carriage top plate 100 and its wheels 142 are raised off of the cutting roller 62. This removes the biasing force on the cutting roller 62 and therefore permits the cutting roller and the anvil roller 60 to be removed from the cutting station 10 when the carriage is shifted to its retracted position depicted in FIG. 3.

Conversely, when the cylinder 144 shifts the biasing member 84 to its lowered position, the bridge plate 132 is extended below the carriage top plate 100 so that the wheels 142 on the wheel carriages 136,138 are pressed against the cutting roller 62 to bias the cutting roller against the anvil roller 60. The clamps 146,148 may then be rotated to apply the desired biasing force on the cutting roller 62 to clamp or lock the cutting roller against the anvil roller 60. This prevents the cutting roller from deflecting upwardly during cutting of the web 12.

OPERATION

The biasing assembly 18 of the present invention may be operated to permit rapid change-over and adjustment of the cutting and anvil rollers 62,60 between cutting runs. During operation of the cutting station 10, the carriage 82 is shifted to its operating position and the biasing member 84 is lowered and clamped in its biasing position as illustrated in FIGS. 1 and 2. This securely biases the cutting roller 62 against the anvil roller 60 for allowing die-cutting or sheeting of the web 12 passing through the printing press.

When it is desired to replace the cutting and anvil rollers 60,62 for a new printing or cutting run, the clamps 146 are first released and cylinder 144 is then operated to raise the biasing member 84. The carriage 82 is then slid rearward on the track 80 away from the frame 14 and rollers 60,62 to the position illustrated in FIG. 3. This completely removes the biasing member 84 from the top of the cutting station frame 14 and therefore provides the operator easy access to the rollers 60,62.

The operator may then retract the pistons 52 on the cylinders 50 to retract the pressure plate 54 from the shafts of the rollers 60,62 to laterally loosen the rollers. The operator then removes the rollers 60,62 from the top of the cutting station frame 14 as depicted in FIG. 3 and inserts new rollers into the frame.

Once the new rollers are inserted, the carriage 82 is shifted forward to its operating position and the cylinder 144 is operated to once again lower the biasing member 84 against the cutting roller 62. Finally, the clamps 146 are operated to clamp the new cutting roller against the new anvil roller.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by letters patent includes the following:

1. A cutting station for a printing press, the cutting station comprising:
 a frame having a longitudinal axis defining a web travel path;
 an anvil roller configured for rotatably mounting on the frame;
 a cutting roller configured for rotatably mounting on the frame adjacent the anvil roller; and
 a biasing assembly including
  a biasing member for biasing the cutting roller against the anvil roller to effect cutting of the web, and
  mounting means for slidably mounting the biasing member to the frame for sliding movement along an axis generally transverse to the frame longitudinal axis.

2. The cutting station as set forth in claim 1, the mounting means including an elongated track extending generally transversely from one side of the frame and a carriage assembly slidably mounted on the track and including structure for supporting the biasing member thereto.

3. The cutting station as set forth in claim 1, the biasing assembly further including means for shiftably supporting the biasing member below the carriage assembly for vertical movement toward and away from the cutting roller between a lowered, engaged position wherein the biasing member engages the cutting roller and biases it against the anvil roller and a raised, released position wherein the biasing member is moved away from the anvil roller.

4. The cutting station as set forth in claim 3, the supporting means including a cylinder operably coupled between the carriage assembly and the biasing member for shifting the biasing member between its raised and lowered positions.

5. The cutting station as set forth in claim 4, the supporting means further including a clamp operably coupled between the carriage assembly and the biasing member for clamping and locking the cutting roller against the anvil roller when the biasing member is shifted to its lowered position.

6. The cutting station as set forth in claim 1, the cutting roller comprising a die roller.

7. The cutting station as set forth in claim 1, the cutting roller comprising a sheeting roller.

8. A cutting station for a printing press, the cutting station comprising:
   an elongated frame having a longitudinal axis defining a web travel path;
   an anvil roller configured for rotatably mounting on the frame;
   a cutting roller configured for rotatably mounting on the frame adjacent the anvil roller; and
   a biasing assembly including
      an elongated track extending generally transversely from one side of the frame,
      a carriage assembly slidably mounted on the track for movement between a retracted position wherein the carriage is moved rearward away from the cutting roller and an operating position wherein the carriage is moved over the cutting roller,
      a biasing member,
      supporting means for shiftably supporting the biasing member to the carriage assembly for vertical movement toward and away from the cutting roller between a lowered position wherein the biasing member engages the cutting roller and biases it against the anvil roller and a raised position wherein the biasing member is moved away from and releases the anvil roller.

9. The cutting station as set forth in claim 8, the supporting means including a cylinder operably coupled between the carriage assembly and the biasing member for shifting the biasing member between its raised and lowered positions.

10. The cutting station as set forth in claim 9, further including a valve disposed between the cylinder and a source of operating fluid for controlling the raising and lowering of the biasing member.

11. The cutting station as set forth in claim 10, further including a three-position toggle switch coupled with said valve and having a raised position for raising the biasing member, a lowered position for lowering the biasing member, and an idle position for stopping the biasing member.

12. The cutting station as set forth in claim 9, the supporting means further including a clamp operably coupled between the carriage assembly and the biasing member for clamping and locking the cutting roller against the anvil roller when the biasing member is shifted to its lowered position.

13. The cutting station as set forth in claim 8, the cutting roller comprising a die roller.

14. The cutting station as set forth in claim 8, the cutting roller comprising a sheeting roller.

15. A printing press comprising:
   a printing unit having a frame defining a web travel path and means for printing a web of material as it passes along the web travel path; and
   a cutting station for cutting the web after it has been printed by the printing unit, the cutting station including
      an elongated frame having a longitudinal axis along the web travel path;
      an anvil roller configured for rotatably mounting on the frame;
      a cutting roller configured for rotatably mounting on the frame adjacent the anvil roller; and
      a biasing assembly including
         an elongated track extending generally transversely from one side of the frame, the track having a longitudinal axis generally perpendicular to the web travel path,
         a carriage assembly slidably mounted on the track for movement between a retracted position wherein the carriage is moved rearward away from the cutting roller and an operating position wherein the carriage is moved over the cutting roller,
         a biasing member,
         supporting means for shiftably supporting the biasing member to the carriage assembly for vertical movement toward and away from the cutting roller between a lowered position wherein the biasing member engages the cutting roller and biases it against the anvil roller and a raised position wherein the biasing member is moved away from and releases the anvil roller.

16. The printing press as set forth in claim 15, the supporting means including a cylinder operably coupled between the carriage assembly and the biasing member for shifting the biasing member between its raised and lowered positions.

17. The printing press as set forth in claim 16, further including a valve disposed between the cylinder and a source of operating fluid for controlling the raising and lowering of the biasing member.

18. The printing press as set forth in claim 18, further including a three-position toggle switch coupled with said valve and having a raised position for raising the biasing member, a lowered position for lowering the biasing member, and an idle position for stopping the biasing member.

19. The printing press as set forth in claim 16, the supporting means further including a clamp operably coupled between the carriage assembly and the biasing member for clamping and locking the cutting roller against the anvil roller when the biasing member is shifted to its lowered position.

20. The printing press as set forth in claim 15, the cutting roller comprising a die roller.

* * * * *